United States Patent [19]

Yamane

[11] Patent Number: 4,837,673
[45] Date of Patent: Jun. 6, 1989

[54] PREPARATION AND DISPLAY OF SEWING DATA ON AN AUTOMATIC SEWING MACHINE

[75] Inventor: Iwao Yamane, Aichi, Japan

[73] Assignee: Mitsubishi Denki Kabushiki Kaisha, Tokyo, Japan

[21] Appl. No.: 262,265

[22] Filed: Oct. 20, 1988

Related U.S. Application Data

[63] Continuation of Ser. No. 925,055, Oct. 30, 1986, abandoned.

[30] Foreign Application Priority Data

Oct. 31, 1985 [JP] Japan ................................. 60-244655

[51] Int. Cl.$^4$ .............................................. D05B 3/02
[52] U.S. Cl. ................................ 364/188; 112/121.11
[58] Field of Search ........................ 364/470, 188–192; 112/121.11, 121.12, 445, 453–458

[56] References Cited

U.S. PATENT DOCUMENTS

| | | | |
|---|---|---|---|
| 4,413,574 | 11/1983 | Hirota et al. | 112/121.12 |
| 4,429,364 | 1/1984 | Maruyama | 364/191 |
| 4,446,520 | 5/1984 | Shigeta et al. | 364/192 |
| 4,499,836 | 2/1985 | Meier et al. | 112/445 |
| 4,512,271 | 4/1985 | Herdeg et al. | 112/121.12 |
| 4,542,469 | 9/1985 | Brandyberry et al. | 364/492 |
| 4,557,207 | 12/1985 | Turner et al. | 112/454 |
| 4,682,554 | 7/1987 | Goto et al. | 112/121.11 |
| 4,688,503 | 8/1987 | Kato | 112/445 |
| 4,692,871 | 9/1987 | Kinoshita et al. | 112/121.12 |

*Primary Examiner*—Allen MacDonald
*Attorney, Agent, or Firm*—Sughrue, Mion, Zinn, Macpeak & Seas

[57] ABSTRACT

An input device for an automatic sewing machine having an easel for tracing a pattern and numeric and function keys. A liquid crystal display prompts the operator to select an input mode and then to input numerical data. The selection and numerical input is performed by touching a cursor pen to selected ones of the keys. The liquid crystal displays the inputted data.

7 Claims, 7 Drawing Sheets

FIG. 2

FIG. 3(a) | 1.PEN_IN  2.ROM_IN |
         | 3.WRITE   4.FUNCTION |

FIG. 3(b) |    SCALE   ***%   |
          |    STITCH  *.*mm  |

FIG. 3(c) | SEWING_SPEED                |
          | 1.H  2.MD1  3.MD2  4.L      |

FIG. 3(d) | INPUT_METHOD                |
          | 1.POINT  2.P_P  3.CONT      |

FIG. 3(e) |  INPUT_START     |
          |         1.YES 2.NO |

FIG. 3(f) | STITCH_NO ****             |
          | 150%  3.2mm  MD2  POINT    |
          |  A      B     C     D      |

(E spans the **** area in the top row)

PREPARATION AND DISPLAY OF SEWING DATA ON AN AUTOMATIC SEWING MACHINE

This is a continuation, of application Ser. No. 06/925,055, filed 10/30/86, now abandoned.

BACKGROUND OF THE INVENTION

1. Field of the Invention

This invention relates to a means for preparing sewing data for an automatic sewing machine in which sewing data for controlling the cloth feeding of the automatic sewing machine is written in a storage medium.

2. Background Art

As is well known in the art, many industrial electric sewing machines include an automatic sewing mechanism having a memory which stores programmed sewing data for automatically controlling the cloth or sewing needle according to a predetermined sewing pattern based on stored sewing data, to thereby allow automatic sewing of the cloth in a desired pattern. The sewing data is written in a storage medium in the memory. The storage medium is replaceable with another storage medium such that different sewing patterns can be easily selected as desired for sewing operations. As a result, the sewing machine can save labor and can be operated at an increased speed. The storage medium may be a semiconductor memory such as a PROM or a magnetic card on which a desired sewing pattern, sewing speed and other control data are stored in the order of sewing operations.

Namely, the sewing data is composed of control commands such as an amount of relative displacement between the sewing needle and the cloth for each stitching, a sewing speed and other movement. Control information for a single sewing pattern is composed of a collection of control commands, each for one stitching sequence. For automatic sewing of a desired pattern on an automatic sewing machine of the type described, it is therefore necessary to prepare and then enter such sewing data in a given storage medium.

A conventional technique of preparing such data has included the steps of lighting or flashing light emitting diodes displaying the operation order, contacting a stylus pen or cursor to a pattern input section in the order according to the display of the diode, and preparing the sewing data according to a given sewing pattern. Such a conventional technique is described in U.S. Pat. No. 4,446,520 to Shigeta et al, incorporated herein by reference, of which the present invention can be considered an improvement.

The conventional technique, however, is deficient in that the space of the display section becomes large as it is required to display the numerous operation sequences.

SUMMARY OF THE INVENTION

An object of this invention is to solve the above problem and to provide a sewing machine data input device which requires little space for its display.

The sewing machine data input device according to the invention comprises a liquid crystal display to indicate the operation order to an operator. The operation orders are sequentially displayed on the liquid crystal display.

BRIEF DESCRIPTION OF THE DRAWINGS

FIG. 5 (a) to (c) are flow charts showing the detailed operation of the step 109 in FIG. 2.

DETAILED DESCRIPTION OF THE PREFERRED EMBODIMENTS

Figure 1:
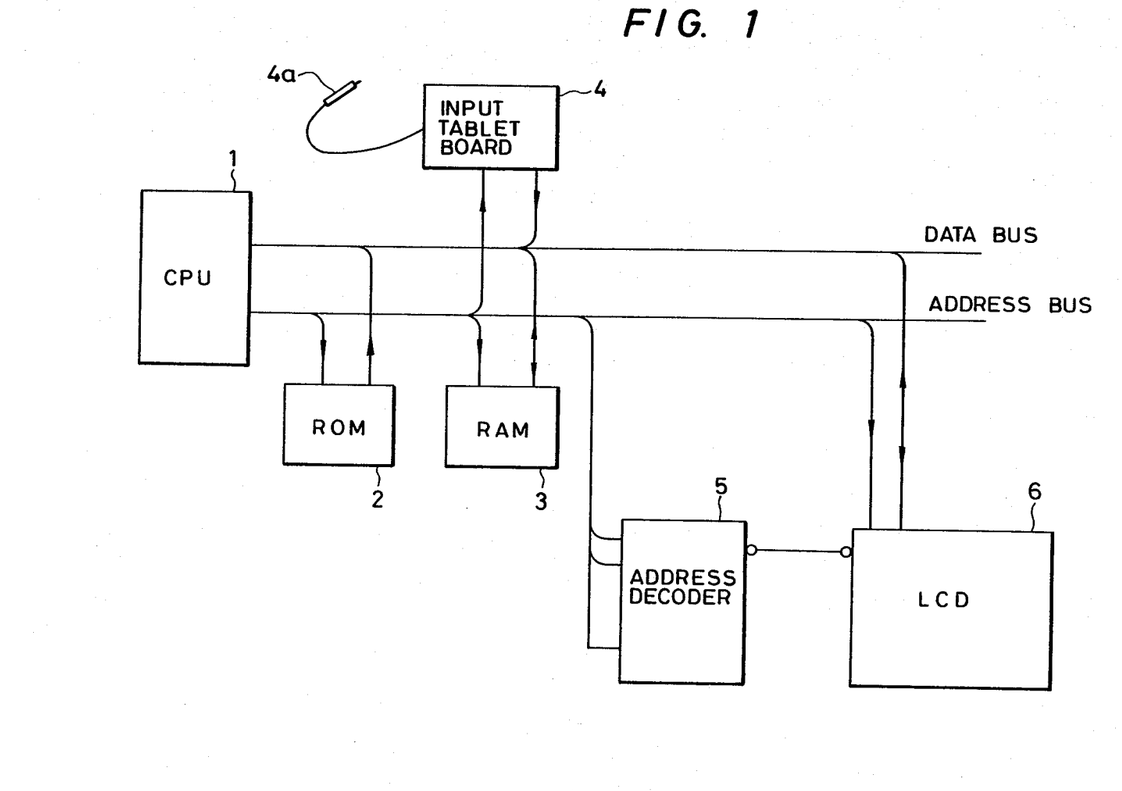
FIG. 1 is a block diagram showing one embodiment of the invention.
Figure 2:
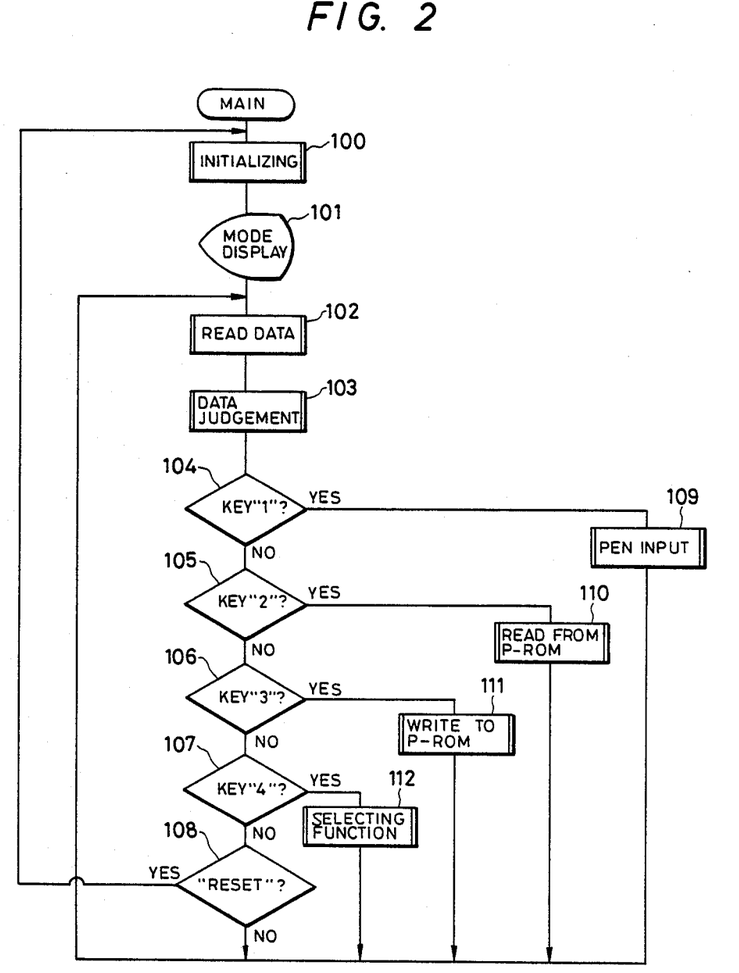
FIG. 2 is a flow chart showing the main operation of the CPU in FIG. 1.

FIG. 1 is a block diagram showing one embodiment of the invention. In the figure are shown a CPU 1, a ROM 2, a RAM 3, a input tablet board 4, an address decoder 5, and a liquid crystal display 6. The ROM 2 is a PROM or more particularly an EPROM so that it is programmable. As is described in U.S. Pat. No. 4,446,520, a stylus pen 4a is used to trace a sewing pattern on a pattern input easel 8 (FIG. 4) of the input tablet board 4. A program, whose flow diagram is shown in FIG. 2, is written into the CPU 1 outputting data to a data bus and an address bus. An operation order is displayed on the liquid crystal display 6 by using the data and decoded address data provided by the address decoder 5. A stylus pen 4a is used to write on the input tablet board 4. A data reading section for reading the data of an EPROM 2 is not shown in FIG. 1. Also, a data writing section for writing the data onto the EPROM 2 is not shown in FIG. 1.

Figure 3A:
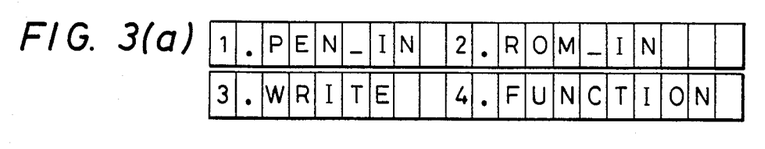
FIGS. 3(a) to 3(f) show the displays of the liquid crystal display in FIG. 1.
Figure 3B:
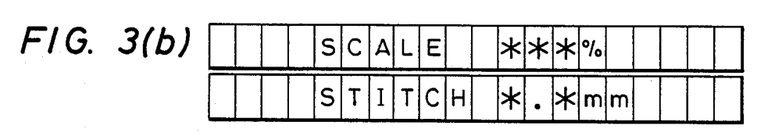

In this embodiment, after an initializing operation of step 100 shown in FIG. 2 is performed, the mode display of step 101 is displayed on the liquid crystal display 6, in the form shown in FIG. 3(a). In FIG. 3(a), "1" shows a pattern input data, "2" shows data reading from the written PROM 2, "3" shows pattern data writing to the PROM 2, and "4" shows the setting of numerous functions. The functions can be selected by pushing the stylus pen 4a to a selecting button mounted on the input tablet board 4.

Figure 4:
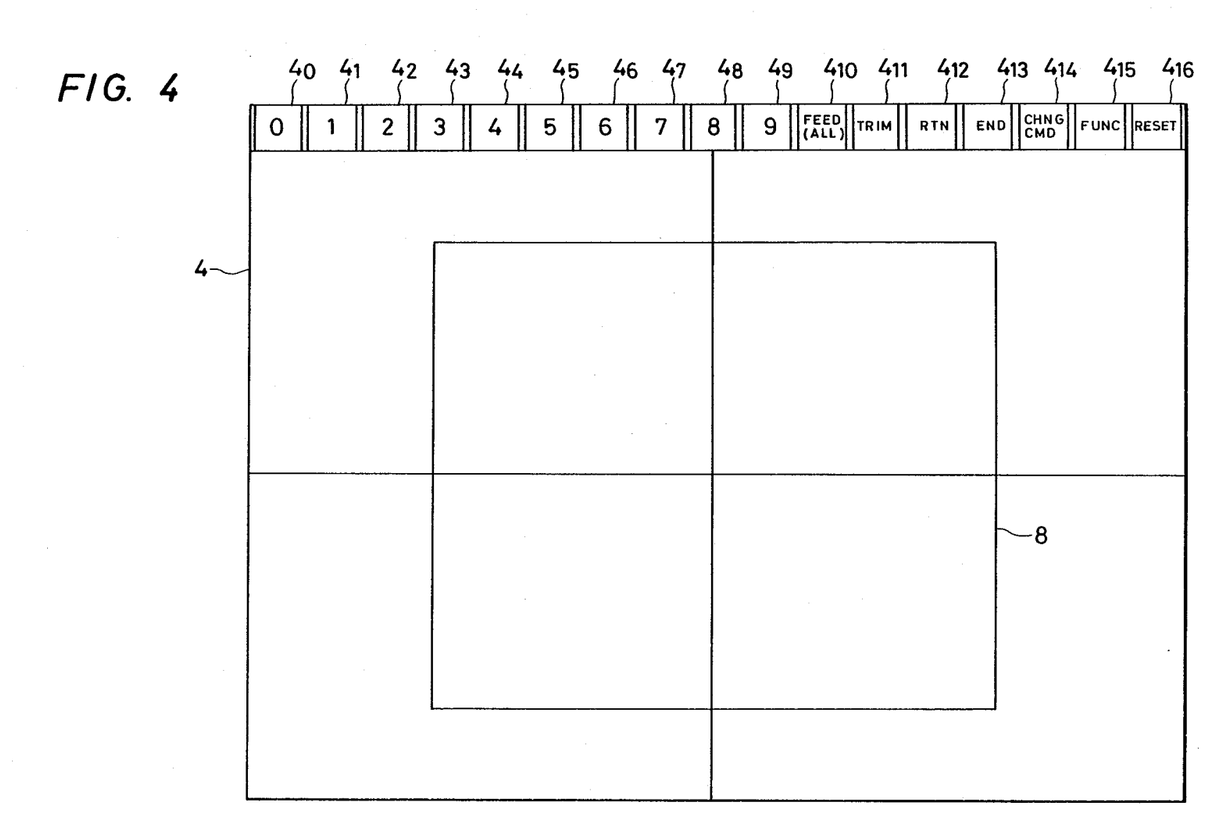
FIG. 4 is the plan view of the input tablet board.

FIG. 4 shows the input tablet board 4. The selecting buttons, composed of numeric buttons $4_0$ to $4_9$ and function buttons $4_{10}$ to $4_{16}$ are mounted on the upper portion of the board surface. The afore-mentioned selection of "1" to "4" is performed by pushing the stylus pen 4a to one of the numeric buttons $4_1$ to $4_4$. In FIG. 4, the functions of the buttons $4_0$ to $4_{16}$ are as shown in the next table.

TABLE 1

| BUTTON CHARACTER | FUNCTION |
| --- | --- |
| 1 | Numerical Data |
| 2 | " |
| 3 | " |
| 4 | " |
| 5 | " |
| 6 | " |
| 7 | " |
| 8 | " |
| 9 | " |
| FEED | Idle data input command |
| TRIM | Thread cutting data input command |
| RTN | Original point returning command |
| END | Data finishing command |
| CHNG CMD | Input display changing command |
| FUNC | Numerous kinds of |

TABLE 1-continued

| BUTTON CHARACTER | FUNCTION |
| --- | --- |
|  | function data are commanded during data input |
| RESET | Clear command of all data and operations |

When the stylus pen $4a$ is pushed to one of the numeric buttons $4_1$ to $4_4$, data are read at step 102 shown in FIG. 2, and the number of the input key (button) is judged at the step 103 by using the read data. Then, the tests of the steps 104 to 107 are performed in accordance with the selected key, and one condition of the testing steps 109 to 112 is set in accordance with the tests. Step 109 is a pen input operation to write and prepare the sewing data. Step 110 is the reading operation to read the sewing data from the PROM 2. Step 111 is the writing operation to write the sewing data to the PROM 2. Step 112 is the selecting operation to select one of the functions of the buttons $4_{10}$ to $4_{15}$ shown in FIG. 4. The processing returns to step 102 after the operation of steps 109 to 112, or when the reset key $4_{16}$ is not pushed at step 108. The processing returns to step 100 when the reset key $4_{16}$ is pushed.

Next, operation of the step 109 will now be described with reference to FIGS. $5(a)$ to $5(c)$. In the operation of step 109, page 1-1 is displayed, as shown in step 200 and, as a result, the display shown in FIG. $3(b)$ is displayed on the liquid crystal display 6. In FIG. $3(b)$, a magnification is inputted with the numeric button $4_0$ to $4_9$, the RESET button $4_{16}$ and the "CHNG CMD" button $4_{14}$ in the portion indicated by "SCALE" and a stitch length is similarly inputted in the portion indicated by "STITCH". This data is read at step 201 shown in FIG. $5(a)$, and is tested at step 202. The button operations except for the numerals 0 to 9, "RESET", and "CHNG CMD" are not received for this data. When the "RESET" button $4_{16}$ is not pushed at step 203, and "CHNG CMD" button $4_{16}$ is not pushed at step 204, then as shown in step 205, the data is displayed on the liquid crystal display 6 and the data of the magnification and stitch length are also sorted in the ROM 3 of FIG. 1. Next, when five characters have not been previously inputted, at step 206 a character number counter INCHR is incremented at step 207 by one count, and then the operations of the steps 200 to 205 are repeated. When the number of the inputted characters is five or "CHNG CMD" is detected at step 204, the character number counter INCHR is initialized at step 208 to zero, and page 1-2 designated at the step 209 is displayed.

Figure 3C:
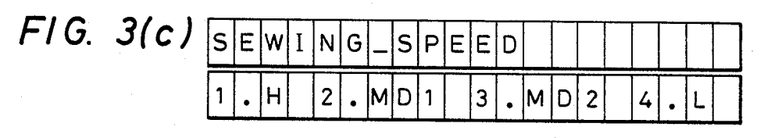

The display of page 1-2 is used to select sewing speeds as shown in FIG. $3(c)$, where "1" represents a high speed, "4" represents a low speed, and "2" and "3" represent intermediate speeds. Processes are previously described for steps 201 to 205 are performed at steps 210 to 214. The signals from the numeric buttons "1" to "4", the "RESET" button and the "CHNG CMD" button are received at step 211. The speed data are processed and stored at step 214.

Figure 3D:
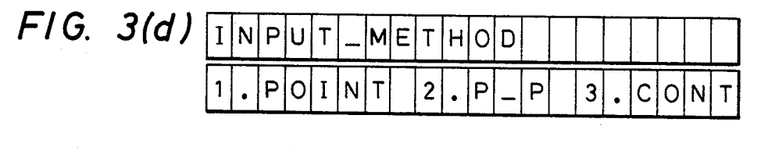
Figure 5A:
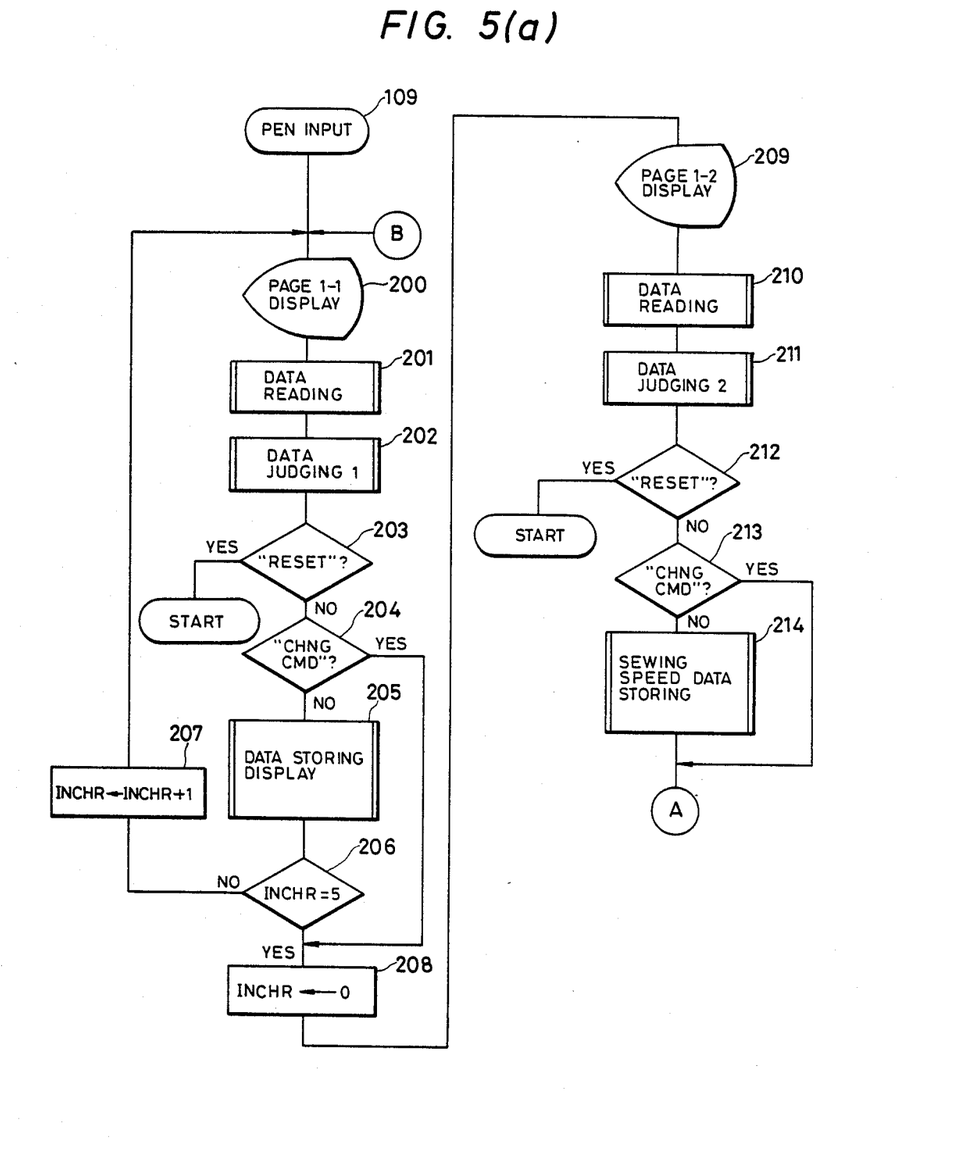
Figure 5B:
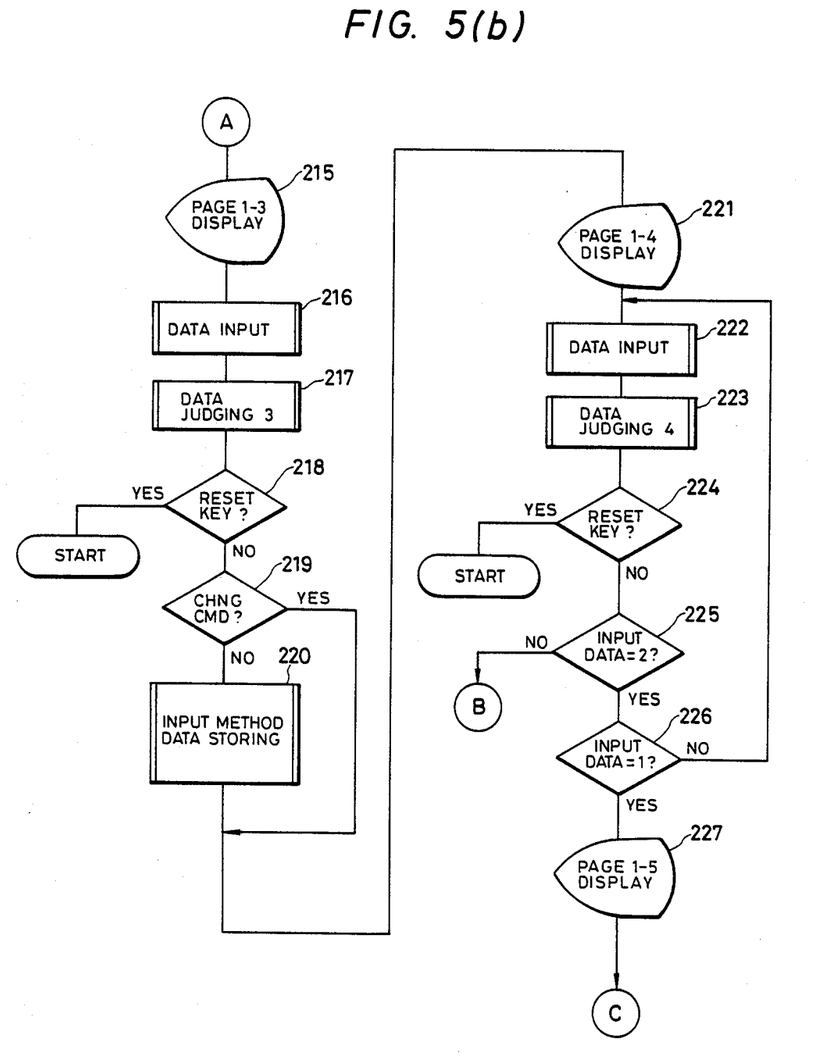

Next, step 1-3 is displayed at the step 215 in the flowchart shown in FIG. $5(b)$. The input method selection display (FIG. $3(d)$) is displayed on the liquid crystal display 6. When the input method is selected, the processes of steps 216 to 220 are performed. At step 217, signals are not received except from the numeric buttons "1" to "3", the "RESET" button and the "CHNG CMD" button.

Figure 3E:
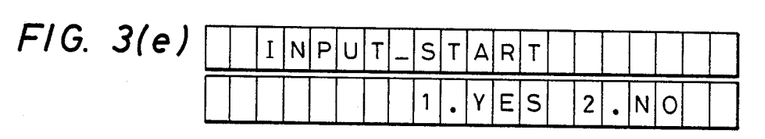
Figure 3F:
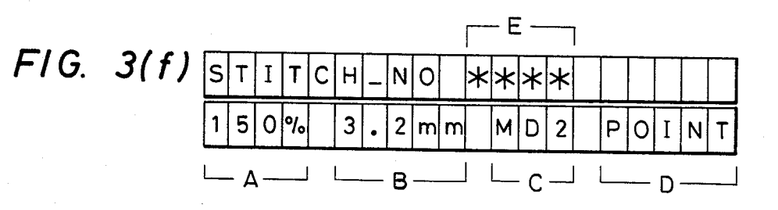

Thereafter, page 1-4 (FIG. $3(e)$) is displayed at step 221 and page 1-5 (FIG. $3(f)$) is displayed at step 227. The input starting display as shown in FIG. $3(e)$ is used to determine whether the input operation is to be started or not. The input operation is started when "1" is selected. The operation is returned to the page 1—1 display when "2" is selected. The set input conditions previously set are displayed as shown in Fig. $3(f)$. In FIG. $3(f)$, the magnification is displayed in part A, the stitch length is displayed in part B, the sewing speed is displayed in part C, and the input method is displayed in part D.

Figure 5C:
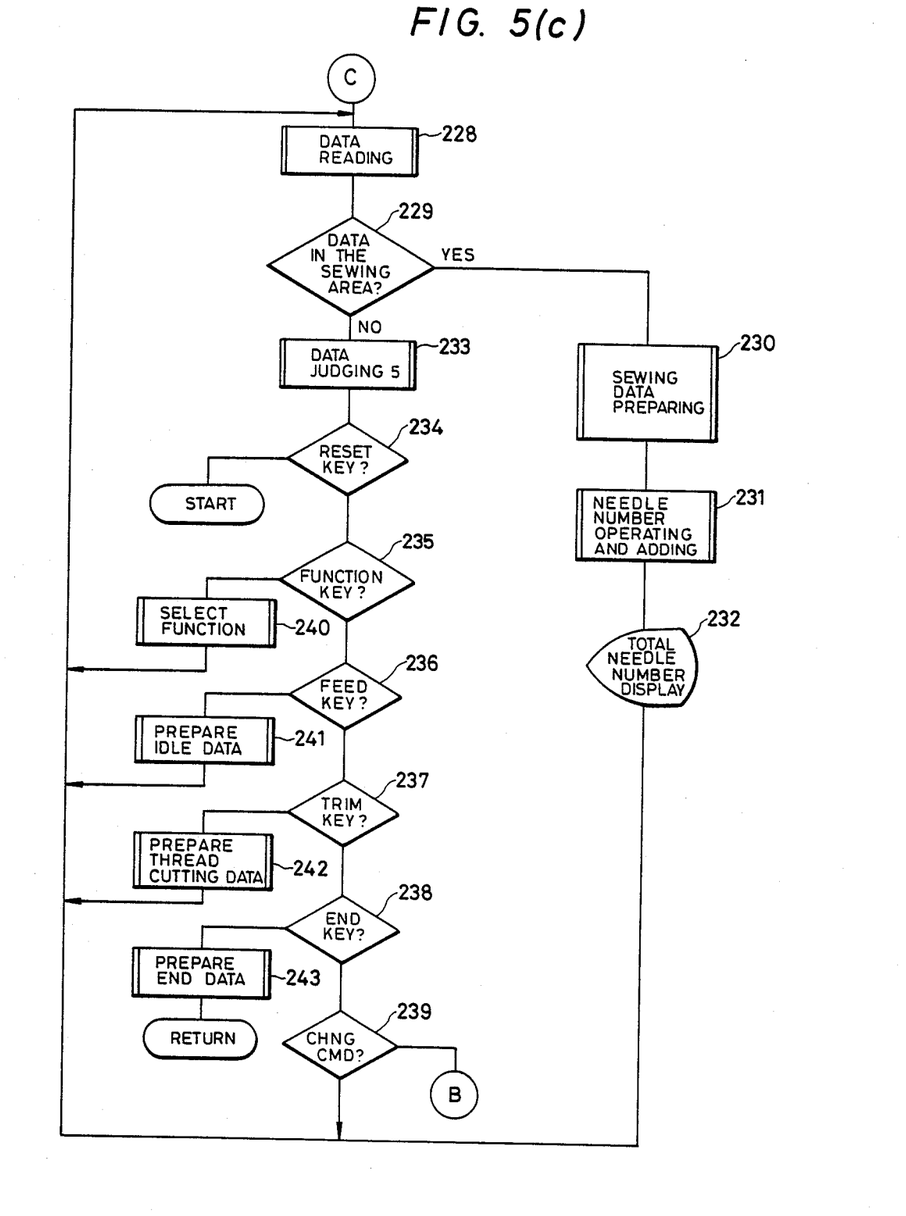

As shown in FIG. $5(c)$, the processes of step 228 to 232 are performed, and the total number of the needles is displayed in part E of the display of FIG. $3(f)$.

In the step 229, however, when it is determined that the data have not been stored in the sewing area of the PROM 2, the data is inserted in the sewing area by performing the processes of steps 233 to 242. At step 217, signals are not received except from the numeric buttons "1" to "3", the "RESET" button and the "CHNG CMD" button. At step 223, the signals except from the numeric buttons "1" and "2" and the "RESET" button are not received. In FIGS. 2 and $5(a)$ to $5(c)$, the steps indicated by double bars on the sides, namely steps 109 to 112, 201, 202, 205, 210, 211, 214, 216, 217, 220, 222, 223, 228, 230, 231, 233, and 240 to 243 are subroutines.

As described above, according to the invention, since necessary items such as the operation orders are sequentially displayed on the liquid crystal display, much information can be displayed in a limited space, and the economy of labor can be improved.

What is claimed is:

1. A data input device for a sewing machine, comprising
    an input tablet board having a pattern input section for inputting an image of a sewing pattern and an operation key input section for inputting character data on a plurality of operation input keys representing said character data, said operation input keys including function keys and numerical keys, said numerical keys indicating a number;
    a manually movable stylus for tracing said image of said sewing pattern on said pattern input section and for selecting respective ones of said plurality of operation input keys in said operation key input section;
    means for preparing sewing data according to said inputted image of said sewing pattern and said inputted character data;
    a liquid crystal display for sequentially displaying selective operations to be performed by said stylus, contents of said liquid crystal display changing in accordance with selection of ones of numerical keys by said stylus to select an input mode, a scale, a pitch, a sewing speed, and a method of inputting said sewing data; and
    means, responsive to said selection of said ones of said numerical keys, for displaying sequential menus from which said input mode, said scale, said pitch, said sewing speed, and said method of inputting said sewing data are respectively selected, said contents of said liquid crystal display changing in accordance with the one of said menus being displayed.

2. A data input device as recited in claim 1, further comprising first control means for controlling said liquid crystal display to display as a first display a plurality of programming modes of said preparing means, one of said modes being selectable by said stylus being applied to a respective one of said numerical keys.

3. A data input device as recited in claim 2, wherein said first control means includes means for causing said liquid crystal display to discontinue displaying said first display and to display a second display corresponding to said selected mode.

4. A data input device as recited in claim 3, wherein said second display includes at least one descriptor and an associated indication of a number of first characters to be input by said stylus and said numerical keys.

5. A data input device as recited in claim 4, wherein said first characters are numeric characters.

6. A data input device as recited in claim 4, wherein said control means includes means for causing said input first characters to be displayed on said liquid crystal display.

7. A data input device as recited in claim 6, wherein said control means includes means for causing said liquid crystal display to discontinue displaying said second display and to display in a third display said input first characters.

* * * * *